United States Patent [19]
Yamaguchi

[11] Patent Number: 5,274,320
[45] Date of Patent: Dec. 28, 1993

[54] METHOD FOR CHARGING RADIO TELEPHONE SYSTEM

[75] Inventor: Kentoku Yamaguchi, Hino, Japan

[73] Assignee: Kabushiki Kaisha Toshiba, Kawasaki, Japan

[21] Appl. No.: 684,861

[22] Filed: Apr. 15, 1991

[30] Foreign Application Priority Data

Apr. 16, 1990 [JP] Japan ................................ 2-97506

[51] Int. Cl.⁵ ............................................ H02J 7/00
[52] U.S. Cl. ..................................... 320/31; 320/43
[58] Field of Search .................... 320/31, 32, 37, 38, 320/39, 40, 43, 44, 48

[56] References Cited

U.S. PATENT DOCUMENTS

| | | | |
|---|---|---|---|
| 3,680,072 | 7/1972 | Charbonnier et al. | 320/43 |
| 4,455,523 | 6/1984 | Koenck | 320/43 |
| 4,724,528 | 2/1988 | Eaton | 320/43 X |
| 4,977,393 | 12/1990 | Arnold et al. | 320/31 X |

Primary Examiner—Kristine L. Peckman
Attorney, Agent, or Firm—Finnegan, Henderson, Farabow, Garrett & Dunner

[57] ABSTRACT

A method for charging a radio telephone system including a radio telephone set having a chargeable battery built therein, wherein a power consumption of the radio telephone set is calculated on the basis of a data relating to the power consumption of the radio telephone set to perform a charging operation based on the power consumption. Also, a power consumption limit is set on the basis of a power consumption indicative of a use frequency so that a normal charging operation is carried out when the power consumption of the radio telephone set is equal to or smaller than the power consumption limit and so that a quick charging operation is carried out when the power consumption of the radio telephone set is larger than the power consumption limit.

13 Claims, 3 Drawing Sheets

METHOD FOR CHARGING RADIO TELEPHONE SYSTEM

BACKGROUND OF THE INVENTION

1. Field of the Invention

The present invention relates to a method for charging a battery built into a radio telephone set for use in a radio telephone system on the basis of the quantity of power consumed by the radio telephone set.

2. Description of the Related Art

A cordless telephone system as one example of a radio telephone system and includes a base unit connected to a telephone line network and a radio telephone set (branch unit) to be coupled to the base unit through a radio link for realizing signal transmission and reception and speech communication with a party. The radio telephone set in the cordless telephone system has a rechargeable battery built therein as its power source. To change the battery, a charger 30, for example, as exemplified in FIG. 4 has been used.

Figure 4:
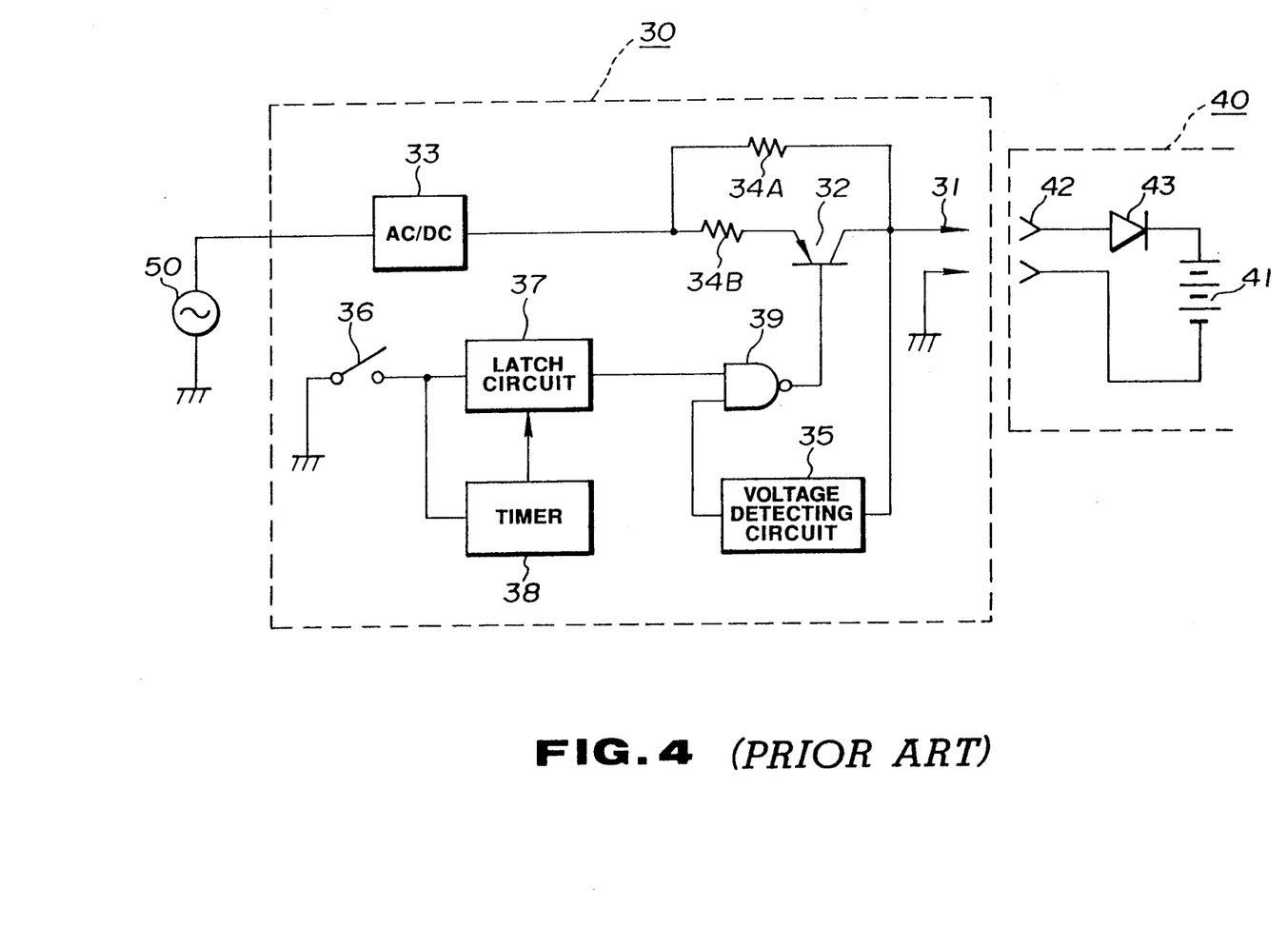
FIG. 4 is a circuit diagram of an arrangement of a prior art charger.

When it is desired to charge a battery 41 provided in a radio telephone set 40 using the charger 30 shown in FIG. 4, a charging connector 31 provided in the charger 30 is connected to a charging connector 42 provided in the radio telephone set 40.

In the above example, if a transistor 32 is in its OFF state, then a charging current flows from a commercial power source 50 to the battery 41 of the radio telephone set 40 through a D.C. stabilizer power supply 33, a current limiting resistor 34A and a diode 43 for reverse-current prevention, thus charging the battery 41.

In the following explanation, the charging operation when the above transistor 32 is in the OFF state will be referred to as the normal charging operation.

During the charging operation, a voltage detecting circuit 35 detects a voltage across the battery 41 and after detecting a voltage exceeding a preset level, outputs a signal of a logical level "L".

For the purpose of effecting quick charging, a user of the charger closes a switch 36. When the switch 36 is closed a latch circuit 37 is set so that the latch circuit 37 outputs a signal of a logical level "H", and, at the same time, a timer 38 is triggered to start measuring a predetermined time.

At this time, if the voltage of the battery 41 is lower than the above predetermined level, an output signal of the voltage detecting circuit 35 has a logical level of "H". In response to the logic level "H" from the voltage detecting circuit 35, a NAND circuit 39 outputs a signal of a logical level "L" and transistor 32 is turned ON.

When the transistor 32 is turned ON, a current limiting resistor 34B is connected in parallel with the current limiting resistor 34A, so that a charging current larger than in the above normal charging operation flows through the battery 41, thus realizing quick charging of the battery 41.

After the voltage of the battery 41 exceeds the above preset level during the quick charging operation or after the timer 38 completes measuring the predetermined time, the transistor 32 is turned OFF, and the charger is returned to its normal charging mode.

With the aforementioned charger 30, since the quick charging time period is restricted by the function of the voltage detecting circuit 35 or timer 38, the battery 41 is prevented from deteriorated in performance due to the limitless performance of the quick charging operation.

However, the limitation of the timer 38 on the quick charging time involves the following disadvantage.

Since the measuring time of the timer 38 is set based on an average use time of the radio telephone set 40, or in other words, based on an average power consumption of the battery 41 as a reference, in the case where the use time of the radio telephone set 40 becomes much longer than its ordinary use time, the quick charging operation will be undesirably stopped before the battery 41 is sufficiently restored or charged.

SUMMARY OF THE INVENTION

In view of the above respect, it is therefore an object of the present invention to provide a method of charging a radio telephone system which method allows charging of a battery of a radio telephone set as quickly as possible according to a power consumption level or current voltage level of the battery.

In accordance with an aspect of the present invention, in order to attain the above object, the following steps are carried out: a data relating to a power consumption of the radio telephone set is detected, the power consumption of the radio telephone set is calculated on the basis of the data relating to the power consumption, and the battery is charged on the basis of the power consumption.

In the present invention, since the charging operation is carried out based on the power consumption of the radio telephone set, the charge level of the battery can be sufficiently restored.

And the charging operation based on the power consumption is carried out by passing a charging current set on the basis of a preset charging time and the power consumption through the battery for the preset charging time, or by passing a preset charging current through the battery for a charging time set based on the preset charging current and the power consumption. As a result, when the preset charging time and the preset charging current are set to have suitable values, the charging operation can be quickly completed.

In accordance with another aspect of the present invention, the following steps are carried out: a data relating to a power consumption of said radio telephone set is detected, the power consumption in a predetermined period is calculated on the basis of the data relating to the power consumption as a power consumption indicative of a use frequency of the radio telephone set, a power consumption limit is set on the basis of the power consumption indicative of the use frequency, the power consumption of the radio telephone set is calculated on the basis of the data relating to the power consumption, and a normal charging operation is performed over the battery when the power consumption of the radio telephone set is equal to or smaller than the power consumption limit and a quick charging operation is performed over the battery when the power consumption of the radio telephone set is larger than the power consumption limit.

The power consumption limit is set by subtracting the power consumption indicative of the use frequency from the power consumption corresponding to the fully charged level of the battery. Accordingly, since the quick charging operation is carried out only when the battery becomes such a charge level that the radio telephone set cannot be used any longer for the above predetermined period, the burden of the battery imposed by the quick charging operation can be lightened.

DESCRIPTION OF THE PREFERRED EMBODIMENTS

Figure 1:
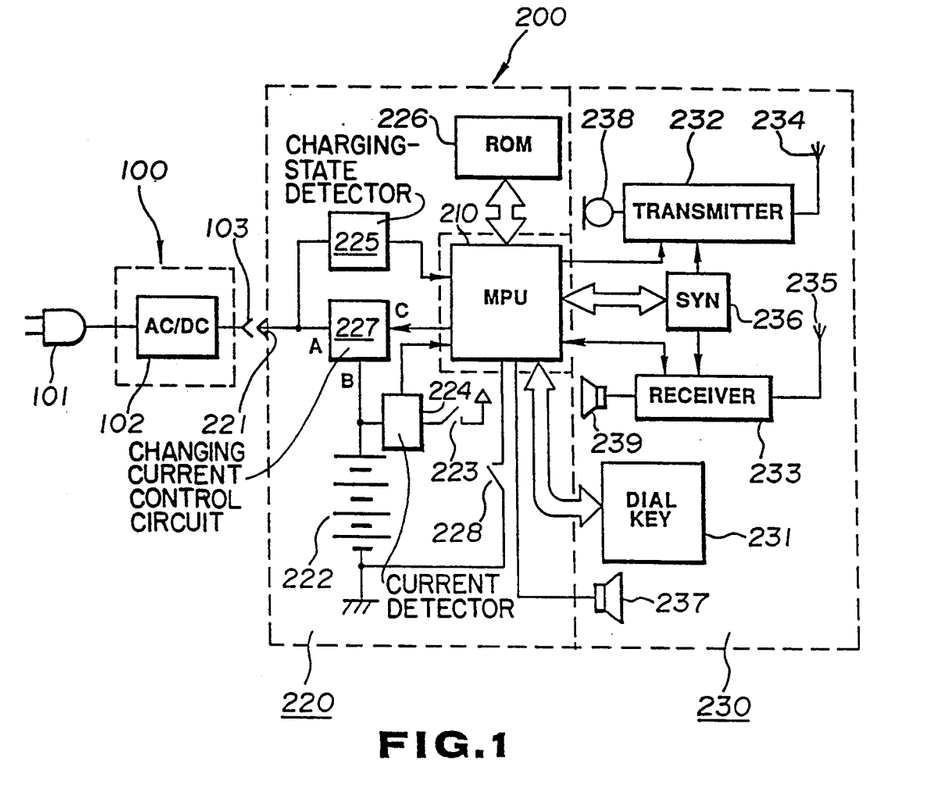
FIG. 1 is a block diagram of a cordless telephone system to which a charging method in accordance with the present invention is applied.

Referring to FIG. 1, there is shown a cordless telephone system to which a charging method in accordance with the present invention is applied. More specifically, the illustrated telephone system includes a charger 100, a radio telephone set (branch unit) 200, and a base unit (not shown) connected to a telephone line network.

The charger 100 has an AC plug 101 to be connected to a commercial power source, a rectifier circuit 102 for reducing and rectifying a voltage of A.C. 100 V supplied from the A.C. plug 101, and a charging terminal 103 to which a D.C. output of the rectifier circuit 102 is applied.

The radio telephone set 200 comprises an MPU 210, a charging controller 220 and a communication section 230. The charging controller 220 has a charging terminal 221 to be connected with the charging terminal 103 of the charger 100 as contacted therewith when the radio telephone set 200 is placed on the charger 100, a chargeable battery 222 as the power supply of the radio telephone set 200, a power switch 223, a power supply current detecting circuit 224 connected between a positive side of the battery 222 and the power switch 223 for detecting a power supply current when the radio telephone set 200 is in use, a charging-state detecting circuit 225 for detecting a charging state of the battery on the basis of the D.C. voltage applied from the charger 100 to the charging terminal 221, a nonvolatile ROM 226 connected to the MPU 210, a charging current control circuit 227 connected between the charging terminal 221 and the positive side of the battery 222 for controlling a charging current to be supplied to the battery 222, and a hook switch 228 connected between the MPU 210 and ground.

In operation, the MPU 210 receives a signal indicative of the power supply current from the power supply current detecting circuit 224 and a signal indicative of the charging state from the charging-state detecting circuit 225.

The battery 222, for example is such a battery having a flat discharging characteristic such as a Ni-Cd battery.

Figure 2:
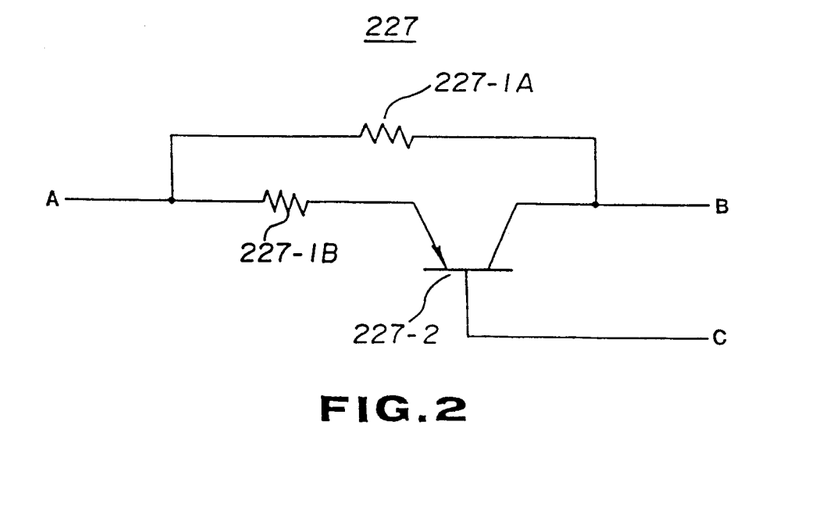
FIG. 2 is a circuit diagram showing an exemplary arrangement of a charging current control circuit.

Shown in FIG. 2 is an arrangement of the charging current control circuit 227 which comprises a current limiting resistor 227-1A and a current limiting resistor 227-1B connected in parallel with the current limiting resistor 227-2 through a transistor 227-1A. In the drawing, terminals A, B and C are connected to the charging terminal 221, the battery 222 and the MPU 210, respectively.

The communication section 230 has a dial key 231 for inputting dial data therethrough, a transmitter 232 and a receiver 233, a transmitting antenna 234 and a receiving antenna 235 respectively connected to the transmitter 232 and the receiver 233, a synthesizer 236 for setting a transmission frequency of the transmitter 232 and a reception frequency of the receiver 233, a sounder 237 for sounding a ringing tone, a handset transmitter 238, and a handset receiver 239.

Now explanation will be made as to the case where a speech communication is carried out through the radio telephone system of the present embodiment.

In the case where it is desired to call from the radio telephone set 223 for speech, a user of the radio telephone set turns ON the power switch 223 and the hook switch 228 and enters dial data through the dial key board 231. This causes a signal to be generated based on the above operation and sent to the MPU 210.

The input signal is then sent from the MPU 210 to the transmitter 232 where the input signal is modulated to be transmitted from the transmitting antenna 234 to the base unit (not shown). The base unit, when receiving the signal, transmits a signal specifying a speech channel to the receiving antenna 235 of the radio telephone set 200.

The speech-channel specifying signal received at the receiving antenna 235 of the radio telephone set 200 is demodulated at the receiver 233 and then applied to the MPU 210. In response to the speech-channel specifying signal it, the MPU 210 controls the transmitter 232, the receiver 233 and the synthesizer 236, with the result that speech can be realized through the handset transmitter and receiver 238 and 239.

Explanation will next be made as to the case where the radio telephone set 200 is called from another telephone.

When the power switch 223 is in the ON state, an incoming calling signal from the base unit is received at the receiving antenna 235, demodulated at the receiver 233 and then sent to the MPU 210. The MPU 210, when receiving the calling signal, judges whether or not there is a difference in ID code or interference. If not, then the MPU 210 executes a process for transmitting a calling-signal response signal to the base unit.

The base unit, on the basis of the received calling-signal response signal, transmits a signal specifying the speech channel to the radio telephone set 200. Since this results in that the MPU 210 sounds the sounder 237, when the user turns ON the hook switch 228, the user can talk with the calling party through the radio telephone set 200.

When the radio telephone set 200 is dismounted from the charger 100 and is in the wait or speech state, the power of the battery 222 of the radio telephone set 200 gradually drops because of the power consumption in the radio telephone set 200.

The radio telephone system of the foregoing embodiment has a function of detecting the power consumed by the radio telephone set 200 when not connected to the charger 100, and providing a charging operation for the battery 222 according to the detected power consumption.

Assume now that, under the above condition, a discharging current of the battery 222 is $I_A$ and a use time of the radio telephone set 200 is $T_A$. Then a current consumption A during use of the radio telephone set 200 is expressed as follows.

$$A = I_A \cdot T_A \tag{1}$$

The power consumption of the radio telephone set 200 corresponds to the current consumption A multiplied by the voltage of the battery 222. However, since the discharging characteristic of the battery 222 is flat, i.e., since the voltage of the battery 222 is substantially constant regardless of the discharging operation as mentioned above, the current consumption A can be regarded as the power consumption. For this reason, in the present embodiment, the above current consumption A is calculated as a power consumption.

The current consumption A can be calculated in the following manners in connection with calculation examples 1 and 2. In the following explanation, when the radio telephone set 200 is in the wait or speech state under the disconnection of the radio telephone set to the charger 100, this state will be referred to as the use mode.

Calculation Example 1

As already mentioned above, the voltage of the battery 222 is substantially constant regardless of the discharging operation. And the magnitude of a load of the battery 222 when the radio telephone set 200 is in the use mode is constant based on the specifications of the radio telephone set 200.

Therefore, the current $I_A$ supplied from the battery 222 in the use mode of the radio telephone set 200 can be regarded as substantially constant and also can be known beforehand.

Hence, the current consumption A is obtained by detecting the use time $T_A$ and then multiplying the known current $I_A$ by the detected use time $T_A$.

Calculation Example 2

The current consumption A is obtained by detecting the current $I_A$ and the use time $T_A$ and then multiplying the current $I_A$ by the time $T_A$.

It will be clear from the foregoing explanation that the use time $T_A$ and the current $I_A$ are the data relating to the current consumption A. In the present embodiment, the use time $T_A$ is detected by a timer built into the MPU 210, while the current $I_A$ is detected by the power supply current detecting circuit 224. When it is desired to calculate the current consumption A according to the above Calculation Example 1, the use time $T_A$ is written in the ROM 226 under control of the MPU 210; whereas, when it is desired to calculate the current consumption A according to the above Calculation Example 2, the use time $T_A$ and the current $I_A$ are written in the ROM 226 under control of the MPU 210.

The aforementioned writing operation is carried out at time intervals of a predetermined time (e.g., 300 ms) so that, even when the power supply switch 223 is erroneously turned OFF during the operation of the radio telephone set 200, the data so far written are preserved in the ROM 226.

In this connection, the use time $T_A$ is not limited to a time taken for one speech. Specifically when a plurality of speeches are carried out before the radio telephone set 200 is placed on the charger 100, the use time $T_A$ is set at an accumulation time of a sum of times taken for the respective speeches and a sum of wait times taken between the respective speeches to be written in the ROM 226.

Since the re-placement of the radio telephone set 200 on the charger 100 causes the charging terminal 221 to be brought into contact with the charging terminal 103 of the charger 100, the charging-state detecting circuit 225 detects the output voltage of the charger 100. As a result, a signal indicative of a request for charging operation is issued from the charging-state detecting circuit 225 to the MPU 210 so that the MPU 210 calculates the current consumption according to the above Calculation Example 1 or 2.

In more detail, in the case of the Calculation Example 1, the use time $T_A$ is read out from the ROM 226 and the current consumption A is calculated on the basis of the read-out time $T_A$. Assuming now that, for example, the use time $T_A$ is 2 hours and the current consumption A of the radio telephone set 200 in the use mode is 100 mA, the current consumption of the radio telephone set 200 is detected as $A = 2 \times 100 = 200$ (mAh).

In the case of the Calculation Example 2, on the other hand, the time TA and the current $I_A$ are read out from the ROM 226, and the current consumption A is detected on the basis of the read-out data. When the use time $T_A$ is 2 hours and the current $I_A$ detected by the power supply current detecting circuit 224 is 100 mA, for example, the detected current consumption A of the radio telephone set 200 is $A = 2 \times 100 = 200$ (mAh) as in the Calculation Example 1.

Although the use time $T_A$ has been handled as a total time of speech and wait times taken for the radio telephone set 200 in the above Calculation Examples 1 and 2, the speech time and the wait time may be measured individually and the current consumption A may be detected by adding up a speech-mode current consumption obtained by multiplying a current flowing through the radio telephone set 200 by the speech time in the speech mode and a wait-mode current consumption obtained by multiplying a current flowing the radio telephone set 200 by the wait time in the wait mode. In the latter case, whether the radio telephone set 200 is in the speech mode or in the wait mode is judged on the basis of the ON or OFF state of the hook switch 228.

When the current consumption A is detected in such a manner as mentioned above, the MPU 210 performs the charging operation of the battery 222 on the basis of the detected current consumption A in accordance with Charging Examples 1, 2 and 3 which follow.

Charging Example 1

A charging time for quick charging operation is previously set and a charging current necessary for restoring the battery 222 in the preset charging time is set. In more detail, for example, when the charging time is set to be 1 hour with the use time of 2 hours and with the current consumption of 200 mAh, the charging current is set to be:

$$200 \text{ mAh}/1 \text{ h} = 200 \text{ mA}$$

The transistor 227-2 in the charging current control circuit 227 of FIG. 2 is controlled so that the charging current 227 of FIG. 2 is controlled so that the charging current is the set level of 200 mA, whereby the quick charging operation with the set current is kept for one hour.

The charging current is set at 200 mA in the foregoing example. However, since a charging efficiency $\alpha$ of the battery 222 satisfies a relationship of $\alpha < 1$ due to the chemical change in the battery 222 caused by the charging operation, it is practically desirable to set the charging current at 200 mA·$(1/\alpha)$ that is a multiplication of the above 200 mA and a reciprocal of the charging efficiency.

The charging time of 1 hour is measured by the timer built into the MPU 210 and at the moment when the charging time elapses, the transistor 227-2 is turned OFF. The turning OFF of the transistor 227-2 causes the radio telephone set to be shifted to the charging operation based only on the current limiting resistor 227-1A, i.e., to the so-called normal charging operation.

The normal charging operation means that, when the battery 222 has an allowable maximum charging current 1C, the battery 222 is charged with a current of about 0.1 C. Specifically, when the allowable maximum charging current 1C is 500 mA for example, the charging current in the normal charging operation becomes about 50 mA.

According to the Charging Example 1, even when the use time of the radio telephone set 200 is long, the battery 222 can be charged up to its nearly fully charged state in a prescribed time.

Charging Example 2

For the purpose of carrying out the quick charging operation in the shortest time, the charging current is previously set at its allowable maximum level 1C, and the charging time of the charging operation with the allowable maximum charging current 1C is set.

For example, when the current consumption with the use time of 2 hours is 200 mAh and the allowable maximum charging current 1C is 500 mA, the charging time is set to be:

$$200 \text{ mAh}/500 \text{ mA} = 0.4 \text{ h}$$

And the transistor 227-2 in the charging current control circuit 227 of FIG. 2 is controlled so that the charging current becomes the allowable maximum level of 500 mA, whereby the charging operation with the set current is kept for 0.4 hours.

The charging time is set at 0.4 h in the foregoing example. However, since a charging efficiency $\alpha$ of the battery 222 satisfies a relationship of $\alpha < 1$ as explained above, a time corresponding to a multiplication of the above charging time and a reciprocal of the charging efficiency $\alpha$ may be practically set as a charging time. Further, for the purpose of preventing any over-charging operation, a time corresponding to a multiplication of the above charging time determined taking the charging efficiency into consideration and a coefficient of about 0.7-0.9 may be set as a charging time.

The above charging time is measured by the timer built into the MPU 210 and at the moment when the charging time elapses, the transistor 227-2 is turned OFF, after which the radio telephone set is shifted to the aforementioned normal charging operation.

According to the Charging Example 2, since the charging operation is carried out with the allowable maximum charging current 1C, the battery 222 can be charged up to its nearly fully charged state in a shorter time.

Charging Example 3

In the case where the use frequency of the radio telephone set 200 is as low as, for example, 2-3 times per day, it is sufficient that the battery 222 is even in its nearly 50% charged state (with respect to its fully charged level). In the case where the above use frequency is as high as, for example, 20 times per day, on the other hand, it is required that battery 222 be in its nearly 90% charged state. In other words, the charge demand level or necessary power level of the battery 222 depends on the use frequency of the radio telephone set 200.

The charge demand level of the battery 222 for the above use frequency is determined by adding a slight margin power to the necessary battery power of the power consumption of the radio telephone set 200 for a predetermined time period (e.g., a whole day). This is because, so long as the battery 222 can keep the above charge demand level, the radio telephone set 200 can be used at the above use frequency during the above predetermined time period.

When a power consumption limit is assumed to be a difference in power consumption between the fully charged level of the battery 222 and the above charge demand level, the power consumption limit is determined by subtracting the power consumption corresponding to the above charge demand level of the battery 222 from the power consumption corresponding to the fully charged level.

The MPU 210 detects the power consumption of the radio telephone set 200 in the above predetermined period as a current consumption indicative of the use frequency in such a manner as in the above Calculation Example 1 or 2, and sets a current consumption limit $A_L$ corresponding to the above power consumption limit on the basis of the detected current consumption and the previously known fully charged level of the battery 222.

Figure 3:
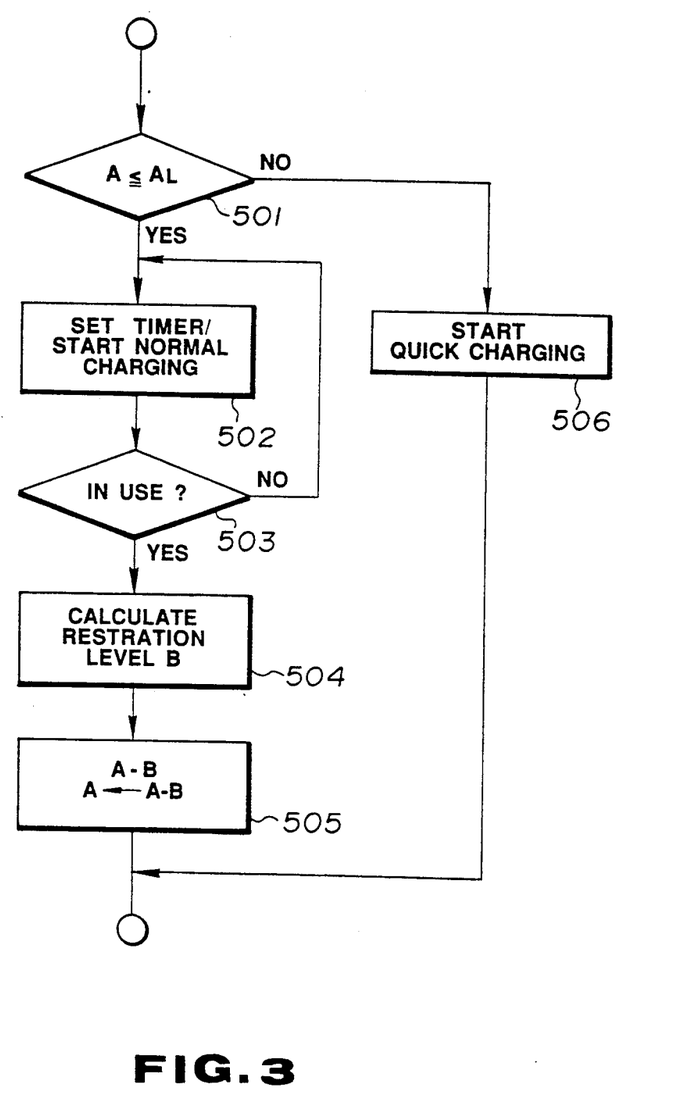
FIG. 3 is a flowchart for explaining an example of a major processing procedure when charging is carried out based on a power consumption limit level set.

Each time the radio telephone set 200 is re-placed on the charger 100, i.e., each time the charging-state detecting circuit 225 detects the output voltage of the charger 100, such a procedure as shown in FIG. 3 is executed.

More specifically, the current consumption A detected in such a manner as in the Calculation Example 1 or 2 is compared with the current consumption limit $A_L$ (step 501). When the comparison result satisfies a relationship of $A \leq A_L$, the aforementioned normal charging operation is started and at the same time, the timer for measuring the charging time of the charging operation is set (step 502). This normal charging operation is continued until the re-use of the radio telephone set 200 is determined at a step 503, i.e., until the output signal of the charging-state detecting circuit 225 disappears.

When the re-use of the radio telephone set 200 is determined, a restoration level B of the battery 222 based on the normal charging operation is calculated (step 504). The restoration level B is obtained by multiplying a normal-charging-mode time measured by the timer by a normal-charging-mode charging current. The above timer is reset at the step 504.

In the next step 505, a current consumption at the time of the re-use of the radio telephone set 200 is calculated. In this step, the MPU 210 adds a current consumption A' varying from time to time to the current consumption A at the re-use time to obtain an addition result of A+A', and rewrites the addition result as the then current consumption A.

On the other hand, if it is determined at the step 501 that the current consumption A is larger than the current consumption limit $A_L$, i.e., that the charged level of the battery 222 drops nearly to the aforementioned charge demand level, the quick charging operation is carried out according to the above Charging Example 1 or 2 (step 506).

In the case where the quick charging operation is carried out according to the Charging Example 2, it may be unnecessary to set the charging current always at its allowable maximum level 1C (500 mA in the above example) and thus the charging current may be set, for example, at about 0.3 C.

It is also possible to change the charging current stepwise. More concretely, it is, for example, possible that the battery 222 is charged with the charging current 1C only for a predetermined time and then charged with the charging current of 0.3 C, in which case the burden on the battery 222 in the charging operation can be lightened.

The quick charging operation is carried out each time the radio telephone set 200 is re-placed on the charger 100 in the Charging Examples 1 and 2, whereas, the charge level restoration of the battery is carried out through the normal charging operation while the battery 222 is at its charge demand level in the Charging Example 3. Accordingly, the time necessary for the quick charging operation can be minimized and thus the burden on the battery 222 in the charging operation can be reduced.

The above current consumption limit $A_L$ is renewed based on the use frequency (current consumption) of the radio telephone set 200 in the above predetermined period. That is, the MPU 210 newly sets the current consumption limit $A_L$ of the radio telephone set 200 in the beginning of the next predetermined period following the previous predetermined period on the basis of the current consumption of the radio telephone set 200 in the previous predetermined period. Accordingly, the decision of the step 501 with respect to the above next predetermined period is made on the basis of the current consumption limit $A_L$ newly set. In the Charging Examples 1, 2 and 3, the transistor 227-2 in FIG. 2 is controlled to effect the constant-current charging operation and a technique of effecting the constant-current charging operation is well known and thus explanation thereof is omitted.

Further, when the current limiting resistors 227-1A and 227-1B in FIG. 2 are set to have suitable values, a practically sufficient charged result can be obtained under such simple ON/OFF control that the transistor 227-2 is turned OFF in the normal charging operation and is turned ON in the quick charging operation. In the case where such ON/OFF control is employed in the Charging Example 3 and the quick charging operation is carried out stepwise with two sorts of charging currents of, e.g., 1C and 0.3C, a current limiting resistor and a transistor for obtaining the charging current of 0.3C are newly added.

Although control over the charging current is carried out within the radio telephone set 200 in the foregoing embodiment, this control may also be effected within the charger 100.

The foregoing embodiment is not limited only to the cordless telephone system but can be effectively applied also to the charging operation of a power supply battery in a portable telephone system or another type of radio telephone system.

What is claimed is:

1. A method for charging a radio telephone system, the radio telephone system including a radio telephone set and a chargeable battery, wherein the radio telephone set consumes power from the battery, said method comprising the steps of:

detecting data relating to the power consumption of the radio telephone set;
   calculating the power consumption of the radio telephone set on the basis of the data relating to the power consumption; and
   charging the battery on the basis of the power consumption of the radio telephone set;
   wherein the calculating step includes the step of calculating a current consumption of the radio telephone set as the power consumption.

2. A method for charging a radio telephone system, the radio telephone system including a radio telephone set and a chargeable battery, wherein the radio telephone set consumes power from the battery, said method comprising the steps of:

detecting data relating to the power consumption of the radio telephone set;
   calculating the power consumption of the radio telephone set on the basis of the data relating to the power consumption; and
   charging the battery on the basis of the power consumption of the radio telephone set;
   wherein the charging step includes the step of passing a charging current through said battery for a preset charging time, the magnitude of the charging current being based upon the preset charging time and the power consumption.

3. A method for charging a radio telephone system as set forth in claim 2, wherein the charging current is set by dividing the power consumption by the preset charging time to obtain a division result; and multiplying the division result by a reciprocal of a charging efficiency of the battery.

4. A method for charging a radio telephone system, the radio telephone system including a radio telephone set and a chargeable battery, wherein the radio telephone set consumes power from the battery, said method comprising the steps of:

detecting data relating to the power consumption of the radio telephone set;
   calculating the power consumption of the radio telephone set on the basis of the data relating to the power consumption; and
   charging the battery on the basis of the power consumption of the radio telephone set;
   wherein said charging step includes the step of passing a preset charging current through the battery for a charging time, the charging time being based on the preset charging current and the power consumption.

5. A method for charging a radio telephone system as set forth in claim 4, wherein the charging time is set by dividing the power consumption by the preset charging current to obtain a division result; and multiplying the division result by a reciprocal of a charging efficiency of the battery.

6. A method for charging a radio telephone system as set forth in claim 4, wherein the charging time is set by dividing the preset charging current to obtain a division result; and multiplying the division result by a reciprocal of a charging efficiency of the battery and by a coefficient ($<1$); whereby over-charging is prevented.

7. A method for charging a radio telephone system as set forth in claim 4, wherein the preset charging current is an allowable maximum charging current of the battery.

8. A method for charging a radio telephone system, the radio telephone system including a radio telephone set and a chargeable battery, wherein the radio telephone set consumes power from the battery, said method comprising the steps of:

detecting data relating to the power consumption of the radio telephone set;

obtaining the power consumption of the radio telephone set over a predetermined period of time longer than any single use on the basis of the data relating to the power consumption to obtain a power consumption indicative of the frequency of use of the radio telephone set;

setting a power consumption limit for each use on the basis of the power consumption indicative of the frequency of use;

calculating the power consumption for each use of the radio telephone set on the basis of the data relating to the power consumption; and     performing a normal charging operation of the battery when the power consumption for each use of the radio telephone set remains equal to or smaller than the power consumption limit and performing a quick charging operation of the battery when the power consumption for each use of the radio telephone set becomes larger than the power consumption limit;

wherein the power consumption calculating step includes the step of calculating a current consumption for each use of the radio telephone set as the power consumption.

9. A method for charging a radio telephone system, the radio telephone system including a radio telephone set and a chargeable battery, wherein the radio telephone set consumes power from the battery, said method comprising the steps of:

detecting data relating to the power consumption of the radio telephone set;

obtaining the power consumption of the radio telephone set over a predetermined period of time longer than any single use on the basis of the data relating to the power consumption to obtain a power consumption indicative of the frequency of use of the radio telephone set;

setting a power consumption limit for each use on the basis of the power consumption indicative of the frequency of use;

calculating the power consumption for each use of the radio telephone set on the basis of the data relating to the power consumption; and     performing a normal charging operation of the battery when the power consumption for each use of the radio telephone set remains equal to or smaller than the power consumption limit and performing a quick charging operation of the battery when the power consumption for each use of the radio telephone set becomes larger than the power consumption limit;

wherein the power consumption limit is set by subtracting the power consumption indicative of the frequency of use from the power consumption corresponding to a fully charged level of the battery.

10. A method for charging a radio telephone system, the radio telephone system including a radio telephone set and a chargeable battery, wherein the radio telephone set consumes power from the battery, said method comprising the steps of:

detecting data relating to the power consumption of the ratio telephone set;

obtaining the power consumption of the ratio telephone set over a predetermined period of time longer than any single use on the basis of the data relating to the power consumption to obtain a power consumption indicative of the frequency of use of the radio telephone set;

setting a power consumption limit for each use on the basis of the power consumption indicative of the frequency of use;

calculating the power consumption for each use of the radio telephone set on the basis of the data relating to the power consumption; and     performing a normal charging operation of the battery when the power consumption for each use of the radio telephone set remains equal to or smaller than the power consumption limit and performing a quick charging operation of the battery when the power consumption for each use of the radio telephone set becomes larger than the power consumption limit;

wherein the quick charging operation is carried out by passing a charging current through said battery for a preset charging time; the magnitude of the charging current being based on the preset charging time and the power consumption for each use.

11. A method for charging a radio telephone system, the radio telephone system including a radio telephoned set and a chargeable battery, wherein the radio telephone set consumes power from the battery, said method comprising the steps of:

detecting data relating to the power consumption of the radio telephone set;

obtaining the power consumption of the radio telephone set over a predetermined period of time longer than any single use on the basis of the data relating to the power consumption to obtain a power consumption indicative of the frequency of use of the radio telephone set;

setting a power consumption limit for each use on the basis of the power consumption indicative of the frequency of use;

calculating the power consumption for each use of the radio telephone set on the basis of the data relating to the power consumption; and     performing a normal charging operation of the battery when the power consumption for each use of the radio telephone set remains equal to or smaller than the power consumption limit and performing a quick charging operation of the battery when the power consumption for each use of the radio telephone set becomes larger than the power consumption limit;

wherein the quick charging operation is carried out by passing a preset charging current through the battery for a charging time, the charging time being based on the present charging current and the power consumption for each use.

12. A method for charging a radio telephone system, the radio telephone system including a radio telephone set and a chargeable battery, wherein the radio telephone set consumes power from the battery, said method comprising the steps of:

detecting data relating to the power consumption of the radio telephone set;

obtaining the power consumption of the radio telephone set over a predetermined period of time longer than any single use on the basis of the data relating to the power consumption to obtain a power consumption indicative of the frequency of use of the radio telephone set;

setting a power consumption limit for each use on the basis of the power consumption indicative of the frequency of use;

calculating the power consumption for each use of the radio telephone set on the basis of the data relating to the power consumption; and performing a normal charging operation of the battery when the power consumption for each use of the radio telephone set remains equal to or smaller than the power consumption limit and performing a quick charging operation of the battery when the power consumption for each use of the radio telephone set becomes larger than the power consumption limit;

wherein the quick charging operation is carried out by passing a preset charging current through the battery for a charging time, the charging time being based on the present charging current and the power consumption for each use; and wherein the preset charging current is an allowable maximum charging current of the battery.

13. A method for charging a radio telephone system, the radio telephone system including a radio telephone set and a chargeable battery, wherein the radio telephone set consumes power from the battery, said method comprising the steps of:

detecting data relating to the power consumption of the radio telephone set;

obtaining the power consumption of the radio telephone set over a predetermined period of time longer than any single use on the basis of the data relating to the power consumption to obtain a power consumption indicative of the frequency of use of the radio telephone set;

setting a power consumption limit for each use on the basis of the power consumption indicative of the frequency of use;

calculating the power consumption for each use of the radio telephone set on the basis of the data relating to the power consumption; and performing a normal charging operation of the battery when the power consumption for each use of the radio telephone set remains equal to or smaller than the power consumption limit and performing a quick charging operation of the battery when the power consumption for each use of the radio telephone set becomes larger than the power consumption limit;

wherein the quick charging operation is carried out by passing a preset charging current through the battery for a charging time, the charging time being based on the present charging current and the power consumption for each use; and wherein the preset charging current comprises two charging currents, one of which is passed through the battery for a predetermining period of the charging time and the other of which is passed through the battery for the remainder of the charging time.

* * * * *

UNITED STATES PATENT AND TRADEMARK OFFICE
CERTIFICATE OF CORRECTION

PATENT NO. : 5,274,320

DATED : December 28, 1993

INVENTOR(S) : Kentoku Yamaguchi

It is certified that error appears in the above-identified patent and that said Letters Patent is hereby corrected as shown below:

Claim 10, column 11, line 68, change "ratio" to --radio--.

Claim 11, column 12, line 27, change "telephoned" to --telephone--.

Claim 13, column 14, line 28, change "predetermining" to --predetermined--.

Claim 11, column 12, line 56, change "present" to --preset--.

Claim 12, column 13, line 21, change "present" to --preset--.

UNITED STATES PATENT AND TRADEMARK OFFICE
CERTIFICATE OF CORRECTION

PATENT NO. : 5,274,320

DATED : December 28, 1993

INVENTOR(S) : Kentoku Yamaguchi

It is certified that error appears in the above-identified patent and that said Letters Patent is hereby corrected as shown below:

Claim 13, column 14, line 24, change "present" to --preset--.

Signed and Sealed this

Fourth Day of October, 1994

*Attest:*

BRUCE LEHMAN

*Attesting Officer*     Commissioner of Patents and Trademarks